United States Patent
Nakagawa

(10) Patent No.: US 11,333,108 B2
(45) Date of Patent: May 17, 2022

(54) COOLING SYSTEM FOR INTERNAL COMBUSTION ENGINE

(71) Applicant: TOYOTA JIDOSHA KABUSHIKI KAISHA, Toyota (JP)

(72) Inventor: Masayoshi Nakagawa, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/150,342

(22) Filed: Jan. 15, 2021

(65) Prior Publication Data
US 2021/0262421 A1  Aug. 26, 2021

(30) Foreign Application Priority Data
Feb. 21, 2020 (JP) .............................. JP2020-028546

(51) Int. Cl.
| | |
|---|---|
| *F01P 1/06* | (2006.01) |
| *F02M 26/28* | (2016.01) |
| *F01P 3/20* | (2006.01) |
| *F01P 5/10* | (2006.01) |
| *F02B 29/04* | (2006.01) |
| *F02M 26/06* | (2016.01) |
| *F02M 26/32* | (2016.01) |
| *F02M 26/35* | (2016.01) |

(52) U.S. Cl.
CPC .............. *F02M 26/28* (2016.02); *F01P 3/20* (2013.01); *F01P 5/10* (2013.01); *F02B 29/0443* (2013.01); *F02M 26/06* (2016.02); *F02M 26/32* (2016.02); *F02M 26/35* (2016.02); *F01P 2060/02* (2013.01)

(58) Field of Classification Search
CPC ........ F02M 26/06; F02M 26/28; F02M 26/33; F02B 29/0493; F02B 29/0443; F02D 41/0065
USPC ...................................... 123/41.31
See application file for complete search history.

(56) References Cited

U.S. PATENT DOCUMENTS

| | | | |
|---|---|---|---|
| 6,301,887 B1 * | 10/2001 | Gorel .................. | F02B 29/0468 60/605.2 |
| 10,119,484 B2 * | 11/2018 | Park .................... | F02B 29/0443 |
| 10,260,461 B2 * | 4/2019 | Minami ................. | F02M 26/33 |

(Continued)

FOREIGN PATENT DOCUMENTS

JP  2017-057788 A  3/2017

*Primary Examiner* — Long T Tran
*Assistant Examiner* — James J Kim
(74) *Attorney, Agent, or Firm* — Finnegan, Henderson, Farabow, Garrett & Dunner, LLP

(57) ABSTRACT

A cooling system is mounted on an internal combustion engine equipped with an EGR device including an EGR passage. The cooling system includes: an intercooler disposed in the intake passage; an EGR cooler disposed in the EGR passage; a condensed water discharger configured to discharge condensed water generated in the EGR cooler from the EGR passage; a radiator configured to cool a first coolant to or below a dew point of the EGR gas flowing into the EGR cooler; a first circulation flow path configured to circulate the first coolant in the order of the radiator, the EGR cooler, and the intercooler; and a pump disposed in the first circulation flow path and configured to circulate the first coolant such that an outlet gas temperature of the EGR cooler is equal to or lower than the dew point of the EGR gas flowing into the EGR cooler.

6 Claims, 6 Drawing Sheets

(56) References Cited

U.S. PATENT DOCUMENTS

2015/0167595 A1* 6/2015 Choi ................... F02M 26/04
                                                    60/605.2
2017/0306898 A1* 10/2017 Kim ..................... F02D 23/00
2017/0314484 A1* 11/2017 Park .................... F02D 41/068
2018/0119651 A1* 5/2018 Minami ............... F02M 26/06

* cited by examiner

COOLING SYSTEM FOR INTERNAL COMBUSTION ENGINE

CROSS-REFERENCE TO RELATED APPLICATION

The present disclosure claims priority under 35 U.S.C. § 119 to Japanese Patent Application No. 2020-028546, filed on Feb. 21, 2020, the content of which is incorporated herein by reference in its entirety.

BACKGROUND

Technical Field

The present disclosure relates to a cooling system for an internal combustion engine, and more particularly to a cooling system having a function of cooling intake air and EGR gas of an internal combustion engine.

Background Art

JP 2017-057788 A discloses a supercharging system of an internal combustion engine equipped with an EGR device. This EGR device is provided with an EGR cooler which cools EGR gas. The supercharging system is equipped with an intercooler which cools intake air. A coolant for cooling the internal combustion engine (engine body) (referred to here as "coolant A") is supplied to the EGR cooler. On the other hand, a coolant (referred to here as "coolant B") is supplied to the intercooler through a circulation flow path that is separated from a circulation flow path of the coolant A supplied to the EGR cooler. Furthermore, when the above-described supercharging system determines that condensed water may be generated in the intercooler, it actively generates the condensed water in the EGR cooler by increasing the circulation flow rate of the coolant A supplied to the EGR cooler, and discharges the generated condensed water to the outside by a gas-liquid separator. Then, the EGR gas with reduced humidity in this way is suppled to an intake system, and thereby, the generation of condensed water in the intercooler is reduced.

SUMMARY

According to the technique described in JP 2017-057788 A, the increase in the circulation flow rate of the coolant A supplied to the EGR cooler for actively generating the condensed water in the EGR cooler is performed after it is determined that condensed water may be generated in the intercooler, as described above. When, for example, an engine operating condition (e.g., gas flow rate or boost pressure) suddenly changes, even if the circulation flow rate of the coolant A supplied to the EGR cooler is increased, it takes time for the EGR gas temperature to change accordingly. Therefore, when, for example, it is determined that condensed water may be generated in the intercooler in association with a sudden change in the engine operating condition, it may be difficult to generate condensed water in the EGR cooler with good responsiveness to the sudden change.

The present disclosure has been made in view of the problem described above, and an object of the present disclosure is to provide a cooling system for an internal combustion engine configured to reduce the generation of condensed water in an intercooler by using dehumidification of EGR gas while avoiding or reducing the response delay of EGR gas temperature.

A cooling system for an internal combustion engine according to the present disclosure is mounted on an internal combustion engine equipped with an EGR device including an EGR passage connecting an exhaust passage and an intake passage. The cooling system includes an intercooler, an EGR cooler, a condensed water discharger, a radiator, a first circulation flow path, and a pump. The intercooler is disposed in the intake passage and is configured to cool intake air. The EGR cooler is disposed in the EGR passage and is configured to cool EGR gas. The condensed water discharger is configured to discharge condensed water generated in the EGR cooler from the EGR passage. The radiator is configured to cool a first coolant to or below a dew point of the EGR gas flowing into the EGR cooler. The first circulation flow path is configured to circulate the first coolant in an order of the radiator, the EGR cooler, and the intercooler. The pump is disposed in the first circulation flow path and is configured to circulate the first coolant such that an outlet gas temperature of the EGR cooler is equal to or lower than the dew point of the EGR gas flowing into the EGR cooler.

The cooling system may include a second circulation flow path configured to supply the first coolant or a second coolant different from the first coolant to the EGR cooler on an upstream side of the first circulation flow path when viewed in a flow direction of the EGR gas in the EGR passage, the second circulation flow path being separated from the first circulation flow path inside the EGR cooler and not passing through the intercooler.

The second circulation flow path may be independent of the first circulation flow path and may be configured to circulate the second coolant.

The cooling system may be configured such that the second coolant having a higher temperature than the dew point of the EGR gas flowing into the EGR cooler is supplied to the EGR cooler from the second circulation flow path.

The EGR cooler may include: a first EGR cooler portion including a first EGR-cooler inner flow path being a part of the first circulation flow path; and a second EGR cooler portion including a second EGR-cooler inner flow path being a part of the second circulation flow path. The second cooler portion may also be disposed on an upper side in a vertical direction with respect to the first EGR cooler portion.

The first EGR cooler portion may be made of austenitic stainless steel. The second EGR cooler portion may also be made of ferritic stainless steel.

According to the cooling system of the present disclosure, the EGR gas flowing into the EGR cooler is cooled by the first coolant circulating through the first circulation flow path such that the outlet gas temperature of the EGR cooler is equal to or lower than the dew point of the EGR gas flowing into the EGR cooler. Then, the condensed water generated from the EGR gas is discharged from the EGR passage by the condensed water discharger. That is, the EGR gas is dehumidified when passing through the EGR cooler. Mixed gas of the dehumidified EGR gas and fresh air is supplied to the intercooler. The dew point of this mixed gas is lowered by the dehumidification of the EGR gas. Moreover, in the first circulation flow path, the first coolant circulates in the order of the radiator, the EGR cooler, and the intercooler, and therefore, the temperature of the first coolant supplied to the intercooler becomes higher than that when the first coolant flows into the EGR cooler. Thus, the temperature of the first coolant at the time of supply to the intercooler takes a value on the higher side with respect to the dew point of the mixed gas. Therefore, the dehumidification of the EGR gas can be used to reduce the generation of the condensed water in the intercooler without taking measures such as complicated control for ensuring the responsiveness of the EGR gas temperature.

DETAILED DESCRIPTION

Figure 1:
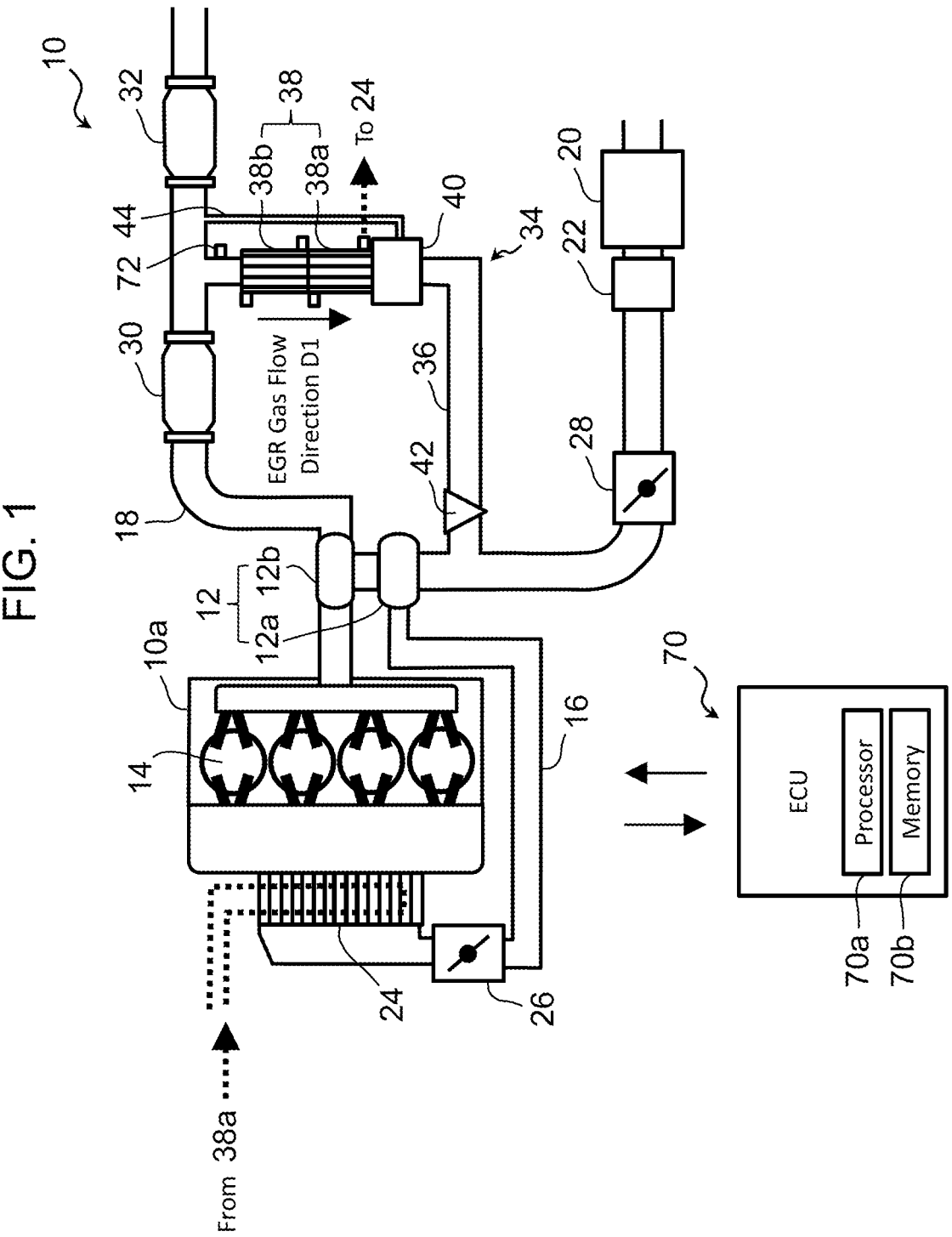
FIG. 1 is a schematic diagram showing a configuration of an internal combustion engine equipped with a cooling system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 5.

1-1. Configuration of Cooling System and Internal Combustion Engine Equipped with the Same FIG. 1 is a schematic diagram showing a configuration of an internal combustion engine 10 equipped with a cooling system 1 according to the first embodiment. The internal combustion engine 10 shown in FIG. 1 is a spark ignition engine as an example (e.g., a gasoline engine), but may be a compression ignition engine. The internal combustion engine 10 is mounted on a vehicle, for example. The internal combustion engine 10 is an in-line four-cylinder engine as an example, the number and arrangement of the internal combustion engine 10 are not particularly limited. The internal combustion engine 10 is a supercharged engine and includes a turbocharger (turbo-supercharger) 12 as an example of the supercharger.

An intake passage 16 and an exhaust passage 18 communicate with each cylinder 14 of the internal combustion engine 10. An air cleaner 20 is installed in the vicinity of an inlet of the intake passage 16. An air flow sensor 22 configured to output a signal responsive to the flow rate of air (fresh air) taken into the intake passage 16 is disposed downstream of the air cleaner 20.

The turbocharger 12 includes a compressor 12a that is arranged downstream of the air flow sensor 22 in the intake passage 16. A water-cooled intercooler 24 configured to cool intake air compressed by the compressor 12a is arranged downstream of the compressor 12a. The intake air cooled by the intercooler 24 is fresh air during non-execution of exhaust gas recirculation (EGR), and is a mixed gas of fresh air and EGR gas during execution of the EGR. An electronically controlled main throttle 26 for controlling the amount of intake air is arranged at a portion of the intake passage 16 between the compressor 12a and the intercooler 24. Moreover, an electronically controlled sub-throttle 28 is arranged upstream of the compressor 12a.

In the exhaust passage 18, a turbine 12b of the turbocharger 12, an upstream catalyst (so-called, a start catalyst) 30, and a downstream catalyst (so-called, an underfloor catalyst) 32 are disposed in this order from the upstream side. These catalysts 30 and 32 are three-way catalysts as an example.

The internal combustion engine 10 includes an EGR device 34. The EGR device 34 includes an EGR passage 36. The EGR passage 36 branches from the exhaust passage 18 at one end thereof, and merges with the intake passage 16 at the other end. That is, the EGR passage 36 connects the exhaust passage 18 and the intake passage 16. More specifically, in an example shown in FIG. 1, the EGR device 34 is a low pressure loop (LPL) type as an example. The EGR passage 36 is connected to the exhaust passage 18 downstream of the turbine 12b (i.e., in FIG. 1, between the upstream catalyst 30 and the downstream catalyst 32), and is connected to the intake passage 16 upstream of the compressor 12a.

In the EGR passage 36, an EGR cooler 38, a condensed water discharger 40, and an EGR valve 42 are arranged in this order from the upstream side in an EGR gas flow direction D1. When the EGR valve 42 opens, a part of the exhaust gas flowing through the exhaust passage 18 is recirculated, as EGR gas, to the intake passage 16 through the EGR passage 36. The EGR cooler 38 cools the EGR gas flowing through the EGR passage 36. A specific structural example of the EGR cooler 38 will be described with reference to FIG. 3. It should be noted that the flow rate of the EGR gas introduced into the intake passage 16 is controlled by adjusting the opening degree of the EGR valve 42. In addition, the flow rate of the EGR gas can also be increased by reducing the opening degree of the sub-throttle 28 to reduce the pressure on the inlet side of the compressor 12a.

The condensed water discharger (hereinafter, also simply referred to as "discharger") 40 discharges condensed water generated in the EGR cooler 38 from the EGR passage 36.

An example of the discharger 40 is a gas-liquid separator (for example, centrifugation type or baffle type (collision type)). By using this kind of gas-liquid separator, the condensed water can be separated and collected from the EGR gas containing the condensed water. The condensed water collected in the discharger 40 is discharged to the exhaust passage 18 (for example, a portion between the upstream catalyst 30 and the downstream catalyst 32) via a drain path 44. It should be noted that, in the example shown in FIG. 1, the discharger 40 is disposed on the downstream side of the EGR cooler 38, the condensed water discharger may be incorporated into the EGR cooler 38. In addition, as another example of the condensed water discharger, a drain device that is installed in an EGR cooler itself and discharges the condensed water dropped on the lower portion of the EGR cooler to the outside of an EGR passage may be used.

Figure 2:
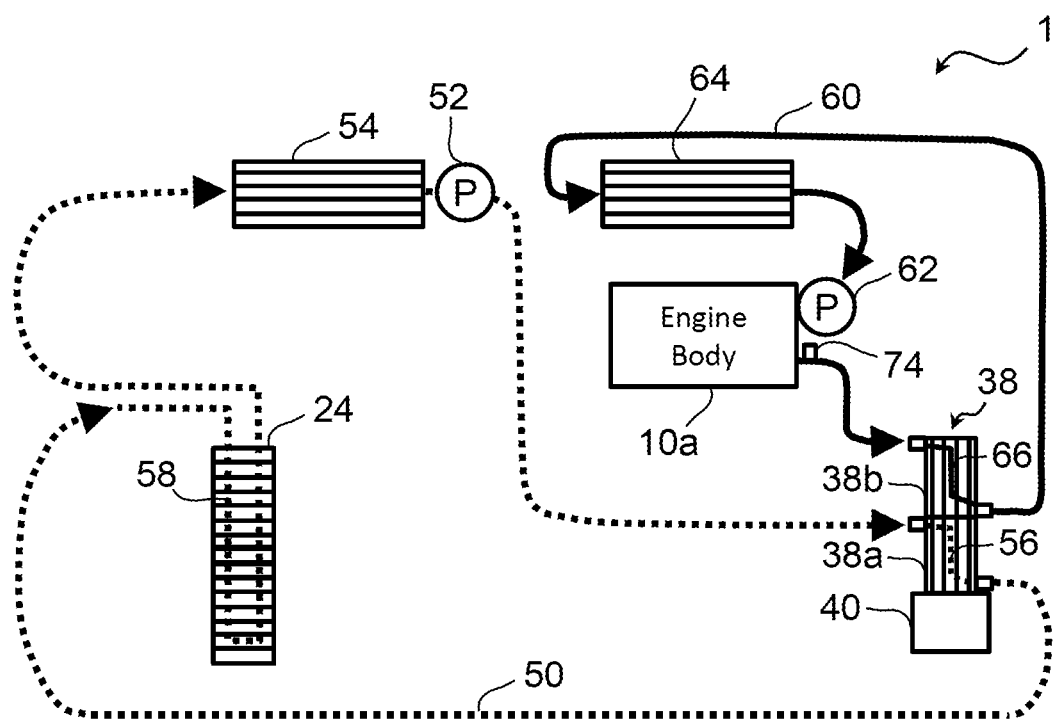
FIG. 2 is a schematic diagram showing a configuration of the cooling system according to the first embodiment of the present disclosure.

An EGR cooler inlet gas temperature sensor 72 configured to detect the temperature of the EGR gas flowing into the EGR cooler 38 is disposed in the vicinity of the inlet of the EGR cooler 38 in the EGR passage 36, FIG. 2 is a schematic diagram showing a configuration of the cooling system 1 according to the first embodiment. In the example of the internal combustion engine 10 shown in FIG. 1 described above, "the cooling system 1 for the internal combustion engine 10" includes the intercooler 24 configured to cool the intake air, the EGR cooler 38 configured to cool the EGR gas, and the condensed water discharger 40 associated with the EGR cooler 38. FIG. 2 illustrates an example of other major components of the cooling system 1, together with the intercooler 24, the EGR cooler 38 and the discharger 40.

As shown in FIG. 2, the cooling system 1 includes dual (first and second) circulation flow paths 50 and 60. The first circulation flow path 50 and the second circulation flow path 60 are both closed loops and are independent of each other. In the first circulation flow path 50, a first coolant is circulated, and, in the second circulation flow path 60, a second coolant different from the first coolant is circulated. The first and second coolants are typically cooling water (coolant). To be more specific, the second circulation flow path 60 mainly cools a main body (engine body) 10a of the internal combustion engine 10. The engine body 10a mentioned here includes at least a cylinder block. The first circulation flow path 50 is separated from the second circulation flow path 60 in order to cool the intercooler 24 in a system separate from the engine body 10a. In other words, the second circulation flow path 60 is configured not to pass through the intercooler 24. The second coolant that cools the engine body 10a basically has a higher temperature than the first coolant that cools the intercooler 24. Because of this, the second coolant is also referred to as "HT (high temperature) cooling water", and the first coolant is also referred to as "LT (low temperature) cooling water".

In the example of the cooling system 1 shown in FIG. 2, the EGR cooler 38 is cooled by using both the LT cooling water (first coolant) and the HT cooling water (second coolant). Specifically, as will be described in detail below with reference to FIG. 3, the EGR cooler 38 includes a first EGR cooler portion 38a through which the LT cooling water flows, and a second EGR cooler portion 38b through which the HT cooling water flows.

A first pump 52 is disposed in the first circulation flow path 50. The first pump 52 is, for example, an electrically driven pump, and can control the flow rate of the LT cooling water that circulates through the first circulation flow path 50. The first pump 52 circulates the LT cooling water (first coolant) in the first circulation flow path 50 such that EGR cooler outlet gas temperature Tgo is equal to or lower than the dew point Td of the EGR gas.

Moreover, in the first circulation flow path 50, a first radiator 54, the first EGR cooler portion 38a, and the intercooler 24 are disposed such that the LT cooling water circulates in them in this order during operation of the first pump 52. More specifically, the first EGR cooler portion 38a includes a first EGR-cooler inner flow path 56 is a part of the first circulation flow path 50. Intercooler 24 includes an IC cooler inner flow path 58 which is a part of the first circulation flow path 50.

The first radiator 54 has a cooling capacity that allows the LT cooling water (first coolant) to cool to a temperature required to cool the EGR gas to or below the dew point Td in the first EGR cooler portion 38a. More specifically, the first radiator 54 can have this kind of cooling capacity by, for example, increasing the heat exchange area of the first radiator 54 such that the temperature of the LT cooling water becomes sufficiently lower than the dew point Td of the EGR gas. Furthermore, for example, the first radiator 54 may be configured to have the above-described cooling capacity in association with a ventilation fan (not shown) for heat exchange between the first radiator 54 and the outside air and an LT cooling water temperature sensor (not shown) configured to detect the LT cooling water temperature. More specifically, the first radiator 54 may have "a cooling capacity that allows the LT cooling water (first coolant) to cool to a temperature required to cool the EGR gas to or below the dew point Td" by driving the ventilation fan in response to the output of the LT cooling water temperature sensor such that "the cooling capacity sufficient to maintain the LT cooling water temperature required to cool the EGR gas to or below the dew point Td" is obtained. It should be noted that, in the cooling system 1 shown in FIG. 2, the first pump 52 and the first radiator 54 correspond to examples of the "pump" and the "radiator" according to the present disclosure, respectively.

A second pump 62 is disposed in the second circulation flow path 60. The internal combustion engine 10 has a crankshaft. The second pump 62 is, for example, a crankshaft driven type or may be an electrically driven type. Also, the engine body 10a, the second EGR cooler portion 38b, and a second radiator 64 are disposed in the second circulation flow path 60. More specifically, the second EGR cooler portion 38b includes a second EGR-cooler inner flow path 66 that is a portion of the second circulation flow path 60. An engine water temperature sensor 74 configured to detect the temperature of the HT cooling water is disposed in the second circulation flow path 60. The engine water temperature sensor 74 is disposed in the vicinity of the outlet of the engine body 10a as an example.

In the example of the second circulation flow path 60 shown in FIG. 2, the HT cooling water after radiating heat to the atmosphere in the second radiator 64 flows in the order of the engine body 10a and the second EGR cooler portion 38b. However, the second circulation flow path 60 may be configured such that, contrary to this example, the HT cooling water after passing through the second radiator 64 flows in the order of the second EGR cooler portion 38b and the engine body 10a.

Furthermore, when viewed in an EGR gas flow direction D1, as shown in FIG. 1, the second EGR cooler portion 38b having the second. EGR-cooler inner flow path 66 on the high temperature side is disposed upstream of the first EGR cooler portion 38a having the first EGR-cooler inner flow path 56 on the low temperature side.

Figure 3:
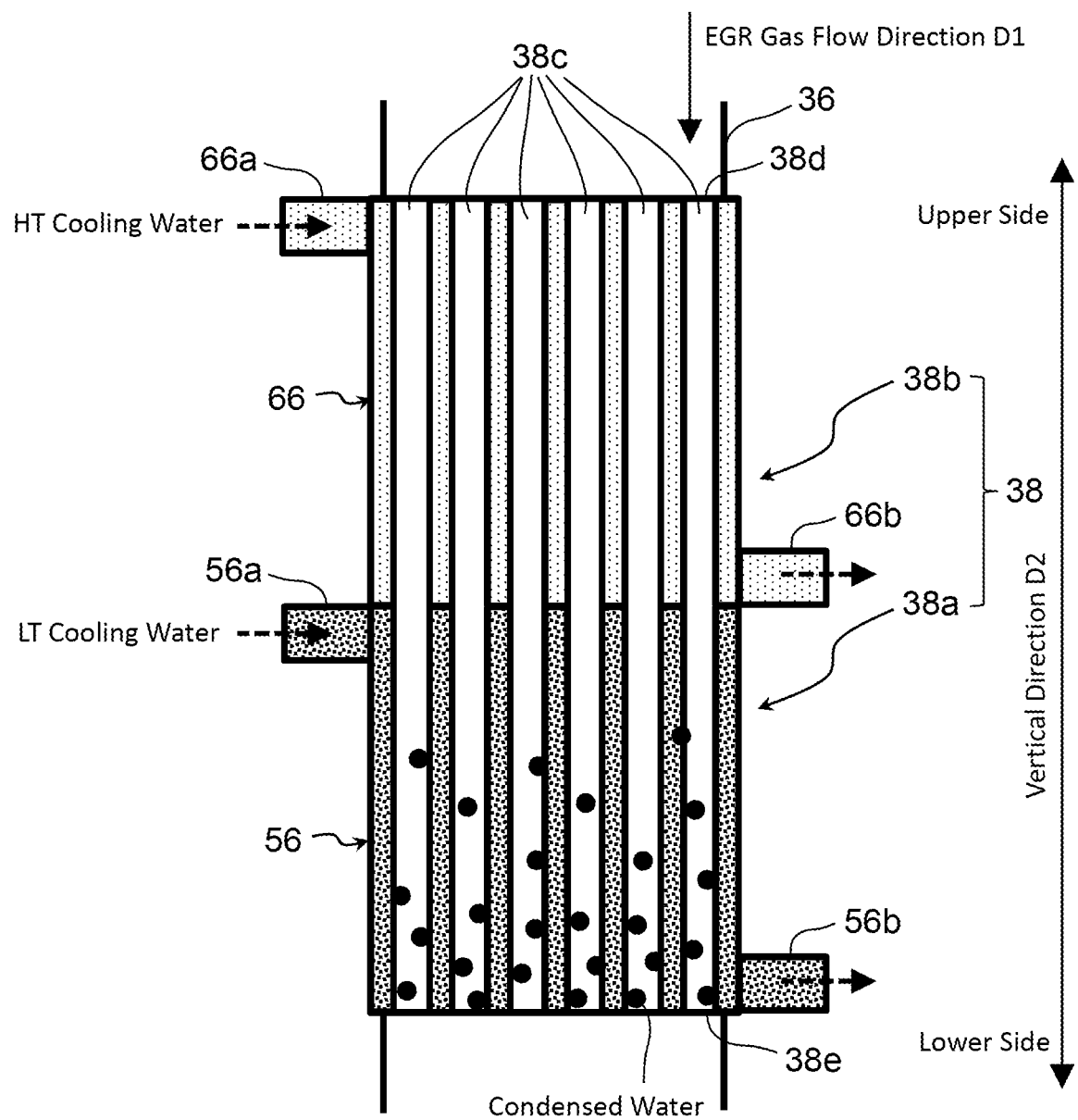
FIG. 3 is a schematic diagram showing an example of a specific structure of an EGR cooler shown in FIG. 2.

FIG. 3 is a schematic diagram showing an example of a specific structure of the EGR cooler 38 shown in FIG. 2. The upper side of the drawing sheet in FIG. 3 corresponds to the upper side in a vertical direction D2. As shown in FIG. 3, the second EGR cooler portion 38b on the high temperature side is disposed on the upper side of the vertical direction D2 with respect to the first EGR cooler portion 38a on the low temperature side.

To be more specific, a plurality of inner gas flow paths 38c that function as a part of the EGR passage 36 are formed inside the EGR cooler 38. Each of the inner gas flow paths 38c is formed in a tubular shape, for example. As shown in FIG. 3, these inner gas flow paths 38c are arranged in a direction extending along the vertical direction D2. That is, the EGR gas flow direction D1 is parallel to the vertical direction D2, and an EGR gas inlet 38d of the EGR cooler 38 is located above an EGR gas outlet 38e in the vertical direction D2.

The first EGR-cooler inner flow path 56 has an LT cooling water inlet 56a and an LT cooling water outlet 56b. As an example, the LT cooling water inlet 56a is formed at the upper end in the vertical direction D2 (i.e., an end on the upstream side of the EGR gas), and the LT cooling water outlet 56b is formed at the lower end in the vertical direction D2 (i.e., an end on the downstream side of the EGR gas). The LT cooling water that has flown into the first EGR-cooler inner flow path 56 from the LT cooling water inlet 56a flows around the individual inner gas flow paths 38c and then flows out from the LT cooling water outlet 56b. The second EGR-cooler inner flow path 66 has an HT cooling water inlet 66a and an HT cooling water outlet 66b. Since the shape example of the second EGR-cooler inner flow path 66 is the same as that of the first EGR-cooler inner flow path 56, the description thereof will be omitted here.

The first EGR cooler portion 38a located on the downstream side of the EGR gas flow and on the lower side in the vertical direction D2 is made of austenitic stainless steel, as an example. Austenitic stainless steel is superior in corrosion resistance to ferritic stainless steel. On the other hand, the second EGR cooler portion 38b located on the upstream side of the EGR gas flow and on the upper side in vertical direction D2 is made of ferritic stainless steel, as an example. Ferritic stainless steel is superior in heat resistance to austenitic stainless steel.

The inner gas flow paths 38c in the second EGR cooler portion 38b located on the upstream side in the EGR gas flow direction D1 is continuous with the inner gas flow paths 38c of the first EGR cooler portion 38a located on the downstream side thereof. In other words, in the configuration example of the EGR cooler 38 shown in FIG. 3, the two heat exchangers are integrally combined as the first EGR cooler portion 38a and the second EGR cooler portion 38b. According to this kind of structure, an EGR cooler having a two-stage cooling structure can be compactly configured. It should be noted that the ratio of the volume of each of the first EGR cooler portion 38a and the second EGR cooler portion 38b to the EGR cooler 38 is determined in consideration of, for example, the temperature distribution of the EGR gas flowing through the EGR cooler 38 and the amount of heat received by the LT cooling water.

The system shown in FIG. 1 includes an electronic control unit (ECU) 70 configured to control the internal combustion engine 10 and the cooling system 1. The ECU 70 includes a processor 70a and a memory 70b. The memory 70b stores various data including maps used for controlling the internal combustion engine 10 and the cooling system 1, and various control programs. The ECU 70 receives sensor signals from various sensors for controlling the internal combustion engine 10 and the cooling system 1. The various sensors mentioned here include the air flow sensor 22, the EGR cooler inlet gas temperature sensor 72, and the engine water temperature sensor 74 that are described above. The processor 70a reads and executes a control program from the memory 70b while using the received sensor signals, and outputs an operation signal for operating various actuators. The various actuators mentioned here include the throttles 26, 28, the EGR valve 42, and the first pump 52 that are described above. As a result, various controls by the ECU 70 are achieved.

1-2. Operation of Cooling System

According to the cooling system 1 configured as described above, the EGR gas passing through the second EGR cooler portion 38b located on the upstream side in the EGR gas flow direction D1 is cooled by the HT cooling water. The temperature of the HT cooling water increases as the warm-up of the internal combustion engine 10 proceeds, and becomes higher than the dew point Td of the EGR gas at least after the warm-up of the internal combustion engine 10 is completed. Also, the EGR gas is further cooled by the LT cooling water in first EGR cooler portion 38a after passing through the second EGR cooler portion 38b. Thus, the EGR cooler 38 has a two-stage cooling structure.

According to the first circulation flow path 50, the relatively low temperature LT cooling water immediately after radiating heat to the atmosphere in the first radiator 54 is supplied to the first EGR cooler portion 38a (the first EGR-cooler inner flow path 56) before the intercooler 24 (IC cooler inner flow path 58). The first pump 52 circulates the LT cooling water (first coolant) in the first circulation flow path 50 such that the EGR cooler outlet gas temperature Tgo becomes equal to or lower than the dew point Td of the EGR gas. Therefore, the EGR gas is cooled to the dew point Td or lower in the first EGR cooler portion 38a. As a result, moisture in the EGR gas condenses. Thus, the condensed water is positively generated in the first EGR cooler portion 38a. The generated condensed water is collected by the discharger 40 and discharged to the outside of the EGR passage 36 (i.e., exhaust passage 18). As a result, the EGR gas is dehumidified.

The EGR gas dehumidified as described above is introduced into the intake passage 16. In the example shown in FIG. 1, the EGR gas is introduced at an upstream position of the compressor 12a. As a result, the EGR gas is sucked into the compressor 12a while being mixed with fresh air.

When the EGR gas is introduced, a mixed gas of the dehumidified EGR gas and the fresh air flows into the intercooler 24. The dew point of this mixed gas is lowered due to the dehumidification of the EGR gas as compared with an example without the dehumidification. Furthermore, according to the configuration of the first circulation flow path 50 of the present embodiment, the LT cooling water after receiving heat by heat exchange with the EGR gas in the first EGR cooler portion 38a is supplied to the intercooler 24 (IC cooler inner flow path 58). That is, while the moisture in the EGR gas is condensed in the first EGR cooler portion 38a to dehumidify the EGR gas, the LT cooling water having a higher temperature than when supplied to the first EGR cooler portion 38a is supplied to the intercooler 24. Therefore, the temperature of the LT cooling water at the time of supply to the intercooler 24 takes a value on the higher side with respect to the dew point of the mixed gas.

1-3. EGR Control and Control of Cooling System

Figure 4:
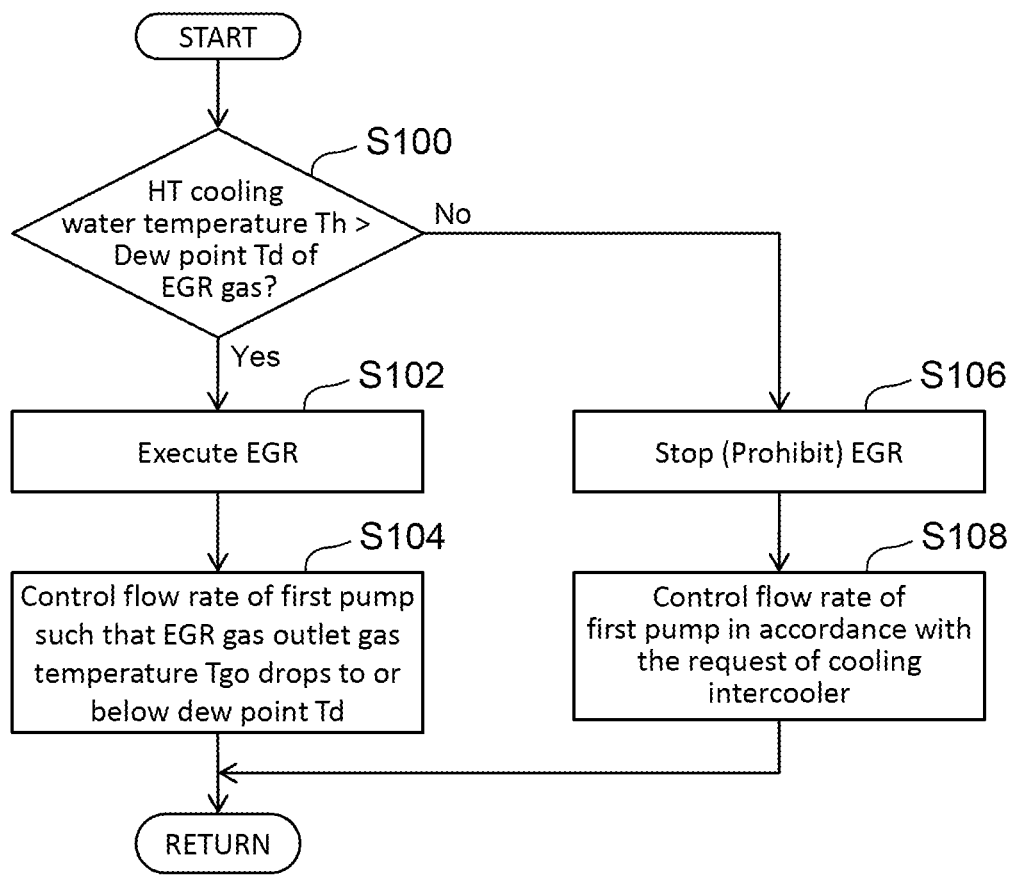
FIG. 4 is a flowchart showing a routine of processing related to EGR control and control of the cooling system according to the first embodiment of the present disclosure.

FIG. 4 is a flowchart showing a routine of processing related to EGR control and control of the cooling system 1 according to the first embodiment. The present routine is repeatedly executed during the operation of the internal combustion engine 10.

In the routine shown in FIG. 4, first, in step S100, the ECU 70 determines whether or not HT cooling water temperature (i.e., engine cooling water temperature) Th is higher than the dew point Td of the EGR gas. More specifically, the dew point Td is the dew point of the EGR gas flowing into the EGR cooler 38 (i.e., the EGR gas before being dehumidified by the EGR cooler 38). Basically, the HT cooling water always circulates in the second circulation flow path 60 during the operation of the internal combustion engine 10 (i.e., during the rotation of the crankshaft). When the internal combustion engine 10 is cold started, the HT cooling water temperature Th increases with a lapse of time due to the heat received from the internal combustion engine 10. The HT cooling water temperature Th used in this determination is obtained by the use of, for example, the engine water temperature sensor 74.

The dew point Td of the EGR gas is about 55° C. On the other hand, the temperature Th of the HT cooling water flowing into the second EGR cooler portion 38b becomes lower than the dew point Td when it is cold, but becomes higher than the dew point as the engine warm-up proceeds. For example, a constant value obtained in advance can be used as the dew point T d used in this step S100. On the other hand, the dew point Td changes more specifically according to the humidity of the EGR gas. Because of this, the humidity of the EGR gas flowing into the EGR cooler 38 may be detected or estimated, and the dew point Td calculated in consideration of the humidity of the EGR gas may be used in this determination.

If the HT coolant temperature Th is higher than the dew point Td of the EGR gas in step S100, the ECU 70 proceeds to step S102. In step S102, the ECU 70 executes the EGR. The EGR is started when the HT cooling water temperature Th rises during the engine warm-up and exceeds the dew point Td. By starting the EGR after the dew point Td is exceeded, the generation of condensed water in the second EGR cooler portion 38b due to the supply of the HT cooling water having a lower temperature than the dew point Td during cold conditions is prevented. During the execution of the EGR, the opening degree of the EGR valve 42 is adjusted such that the EGR gas is introduced at an EGR rate according to, for example, engine operating conditions (engine torque and engine speed).

Where the ECU 70 proceeds to step S102 to execute the EGR, the ECU 70 executes an LT cooling water circulation control by the processing of step S104. Specifically, in step S104, the ECU 70 controls the flow rate (circulation flow rate) of the first pump 52 such that the EGR cooler outlet gas temperature Tgo is equal to or lower than the dew point Td of the EGR gas.

Figure 5:
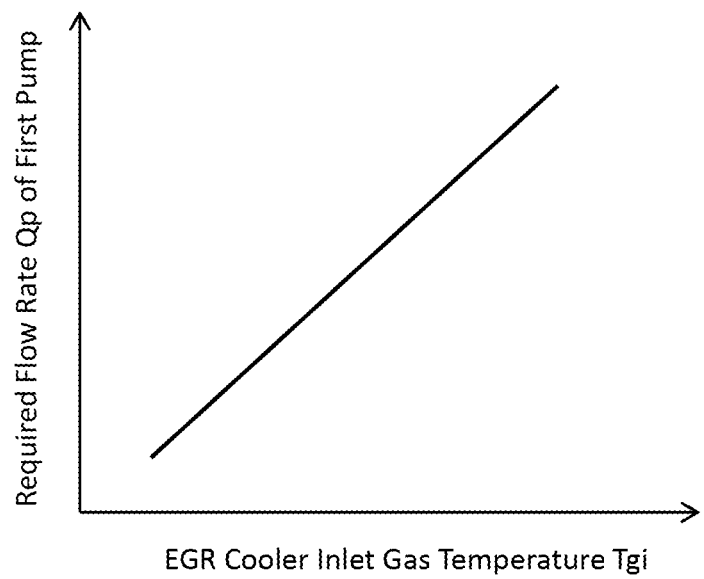
FIG. 5 is a graph showing a relationship between the flow rate of a first pump and EGR cooler inlet gas temperature Tgi.

An example of the LT cooling water circulation control during the execution of the EGR is as follows. FIG. 5 is a graph showing a relationship between the flow rate of the first pump 52 and the EGR cooler inlet gas temperature Tgi. The vertical axis of FIG. 5 shows a required flow rate Qp of the first pump 52 required to control the EGR cooler outlet gas temperature Tgo to or below the dew point Td. If the EGR gas flow rate is the same, the required flow rate Qp becomes greater when the EGR cooler inlet gas temperature Tgi is higher, as shown in FIG. 5. Accordingly, in an example of the LT cooling water circulation control, the required flow rate Qp is set in advance so as to be greater when the EGR cooler inlet gas temperature Tgi is higher in a map that defines a relationship as shown in FIG. 5, and is stored in the memory 70b. The ECU 70 acquires the required flow rate Qp depending on the EGR cooler inlet gas temperature Tgi from this kind of map, and controls the flow rate of the first pump 52 so as to achieve the acquired required flow rate Qp. The EGR cooler inlet gas temperature Tgi can be obtained by the use of, for example, the temperature sensor 72 described above. Moreover, although not shown here, similarly to the EGR cooler inlet gas temperature Tgi, the required flow rate Qp becomes greater when the flow rate of the EGR gas flowing through the EGR passage 36 is greater. Because of this, the required flow rate Qp may be set to be greater when the flow rate of the EGR gas is greater. The flow rate of the EGR gas can be calculated based on, for example, the intake air flow rate detected by the air flow sensor 22 and the EGR rate.

If, on the other hand, the HT cooling water temperature Th is equal to or lower than the dew point Td of the EGR gas in step S100 because the internal combustion engine 10 is in a cold state, the ECU 70 proceeds to step S106. In step S106, the ECU 70 stops (prohibits) the EGR.

Where the ECU 70 proceeds to step S106 and stops (prohibits) the EGR, the ECU 70 executes the LT cooling-water circulation control by the processing of step S108. In the LT cooling water circulation control when the EGR is stopped in this way, the ECU 70 controls the flow rate of the first pump 52 in response to the cooling request of the intercooler 24. In detail, when the internal combustion engine 10 is in a cold state and the intake air is cooled too much by the intercooler 24 in a low load region, misfire is likely to occur. Moreover, when the EGR is stopped, the LT cooling water may not be supplied to the first EGR cooler portion 38a, or may be supplied conversely. Accordingly, in an example of the LT cooling water circulation control when the EGR is stopped, the ECU 70 controls the flow rate of the LT cooling water (i.e., the flow rate of the first pump 52) so as to be smaller in low load conditions in which the engine torque is equal to or lower than a designated value, than in load conditions in which the engine torque is higher than the designated value. Alternatively, the circulation of the LT cooling water may be stopped under this kind of low load conditions. Furthermore, in the load conditions in which the engine torque is higher than the designated value described above, in order to increase the output performance of the internal combustion engine 10, the flow rate of the LT cooling water may be increased by a greater amount when at least one of the engine torque and the engine speed is higher.

1-4. Effect

According to the cooling system 1 of the present embodiment described so far, during the execution of the EGR, the first pump 52 circulates the LT cooling water (first coolant) in the first circulation flow path 50 such that the EGR cooler outlet gas temperature Tgo becomes equal to or lower than the dew point Td of the EGR gas. As a result, the EGR gas is dehumidified by the first EGR cooler portion 38a and the discharger 40. The mixed gas of the dehumidified EGR gas and fresh air is supplied to the intercooler 24. The dew point of this mixed gas is lowered by the dehumidification of the EGR gas. Moreover, in the first circulation flow path 50, the LT cooling water circulates in the order of the first radiator 54, the EGR cooler 38 (first EGR cooler portion 38*a*), and the intercooler 24. Because of this, the temperature of the LT cooling water supplied to the intercooler 24 becomes higher than that when the LT cooling water flows into the first EGR cooler portion 38*a*. Thus, the temperature of the LT cooling water at the time of supply to the intercooler 24 takes a value on the higher side with respect to the dew point of the mixed gas. Therefore, the dehumidification of the EGR gas can be used to reduce the generation of the condensed water in the intercooler 24 without taking measures such as complicated control for ensuring the responsiveness of the EGR gas temperature.

Moreover, the cooling system 1 according to the present embodiment is provided with the second circulation flow path 60 together with the EGR cooler 38 having a two-stage cooling structure. The second circulation flow path 60 is independent of the first circulation flow path 50, and supplies the second coolant (HT cooling water) to the second EGR cooler portion 38*b* located on the upstream side of the first circulation flow path 50 when viewed in the EGR gas flow direction D1. According to this kind of configuration, the EGR gas can be cooled preliminarily in the second EGR cooler portion 38*h* before the EGR gas flows into the first EGR cooler portion 38*a*. As a result, when compared with an example shown in FIG. 7 described below, the amount of heat received from the EGR gas to the first coolant (LT cooling water) used for cooling the intercooler 24 can be reduced. This can reduce a decrease in the intake air cooling capacity of the intercooler 24 due to a temperature rise of the first coolant. Therefore, the intake air (mixed gas) can be cooled satisfactorily while the generation of condensed water in the intercooler 24 is reduced. In addition, the EGR gas after being pre-cooled by the second EGR cooler portion 38*b* flows through the first EGR cooler portion 38*a*. Therefore, if the corrosion resistance to the condensed water is satisfied, even a material having relatively low heat resistance (for example, austenitic stainless steel) can be selected as the material of the first EGR cooler portion 38*a*.

Figure 6:
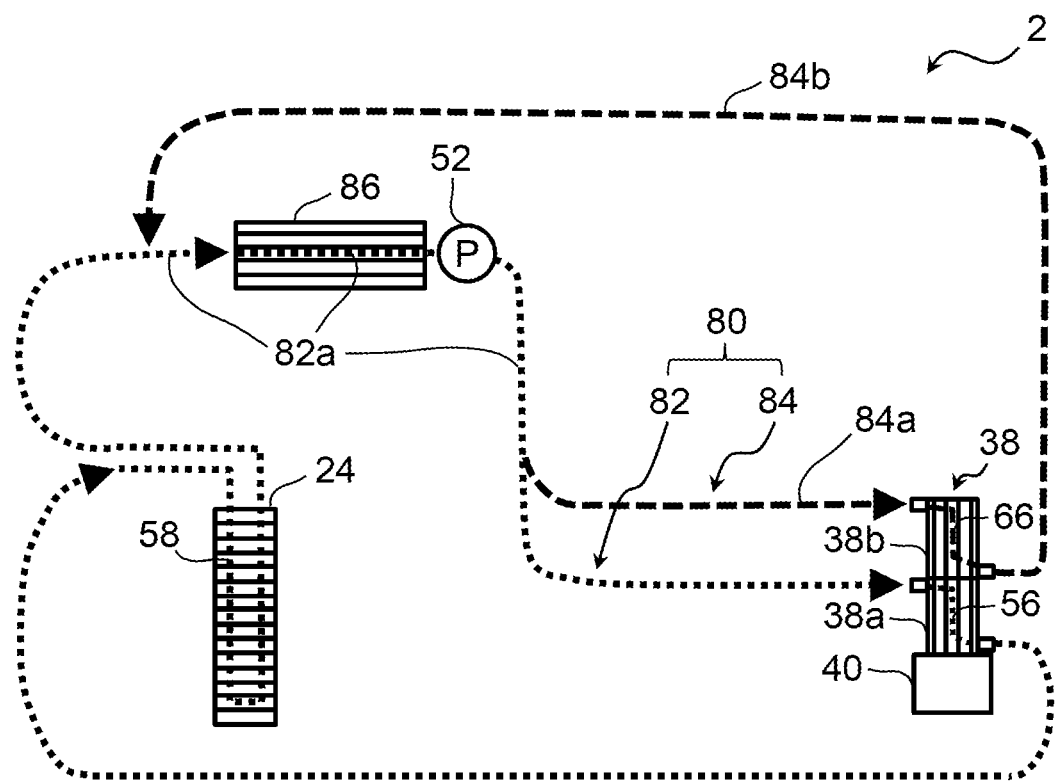
FIG. 6 is a schematic diagram showing a configuration of a cooling system according to a second embodiment of the present disclosure.

Regarding the two-stage cooling structure of the EGR cooler 38, in the example of the cooling system 1 shown in FIG. 2, unlike an example shown in FIG. 6 described below, the second circulation flow path 60 is completely independent of the first circulation flow path 50, and the HT cooling water different from the LT cooling water flows in the second circulation flow path 60. According to this kind of configuration, the cooling of the EGR gas can be shared by the LT cooling water and the HT cooling water of different systems. Therefore, when compared with the example shown in FIG. 6, the amount of heat received from the EGR gas to the LT cooling water (first coolant) used for cooling the intercooler 24 can be reduced while the cooling load of the first circulation flow path 50 as a whole is reduced (i.e., while the size of the first radiator 54 is reduced). Furthermore, by using the second circulation flow path 60 that is completely independent from the first circulation flow path 50, it is not necessary to use the first coolant for pre-cooling unlike the example shown in FIG. 6. It is therefore possible to perform pre-cooling while reducing the flow rate of the first coolant.

Moreover, in the cooling system 1 according to the present embodiment, the HT cooling water (second coolant) is basically (in other words, except cold conditions of the internal combustion engine 10) has a higher temperature than the dew point Td of the EGR gas. Even if the HT cooling water having a temperature higher than the dew point Td as just described is supplied to the second EGR cooler portion 38*b*, the condensed water is not generated from the EGR gas inside the second EGR cooler portion 38*b*. Therefore, if the heat resistance is satisfied, even a material having relatively low corrosion resistance (for example, ferritic stainless steel) can be selected as the material of the second EGR cooler portion 38*b*.

Moreover, in the cooling system 1 according to the present embodiment, as shown in FIG. 3, the second EGR cooler portion 38*b* through which the HT cooling water flows is disposed on the upper side in the vertical direction D2 with respect to the first EGR cooler portion 38*a* through which the LT cooling water flows. Then, the second EGR cooler portion 38*b* is located on the upstream side of the EGR gas flow as compared with the EGR cooler portion 38*a*. According to this kind of configuration, the condensed water generated in the inner gas flow paths 38*c* in the first EGR cooler portion 38*a* can be prevented from flowing into the second EGR cooler portion 38*b* due to the gas flow and the action of gravity. It should be noted that, in the example shown in FIG. 3, the EGR cooler 38 is arranged such that the EGR gas flow direction D1 is parallel to the vertical direction D2. However, in order to achieve this effect (i.e., the effect of preventing the condensed water from flowing into the second EGR cooler portion 38*b*), these directions D1 and D2 may not always be strictly parallel. That is, as long as the arrangement is such that the EGR gas flows from the second EGR cooler portion 38*b* located on the upper side in the vertical direction D2 toward the first EGR cooler portion 38*a* located on the lower side, the EGR gas flow direction D1 may be inclined with respect to the vertical direction D2.

Furthermore, in the cooling system 1 according to the present embodiment, the first EGR cooler portion 38*a* is made of austenitic stainless steel having excellent corrosion resistance, and the second EGR cooler portion 38*b* is made of ferritic stainless steel having excellent heat resistance. As a result, it is possible to reduce the corrosion due to the condensed water generated in the first EGR cooler portion 38*a*, and to reduce the occurrence of problems due to heat even if high-temperature HT cooling water is introduced into the second EGR cooler portion 386. Thus, according to the cooling system 1, the EGR gas can be efficiently cooled while achieving both heat resistance and corrosion resistance of the EGR cooler 38.

1-5. Modification Examples with Respect to First Embodiment

1-5-1. Another Example of Control of First Pump During Execution of EGR

The control (LT coolant circulation control) of the first pump 52 for allowing the EGR cooler outlet gas temperature Tgo to cool to or below the dew point Td of the EGR gas during the execution of the EGR is not limited to adjusting the flow rate of the first pump 52 as in the example described in step S104. That is, since the LT cooling water flows in the order of the first EGR cooler portion 38*a* and the intercooler 24, the temperature of the LT cooling water at the time of inflow to the intercooler 24 is higher than that at time of inflow to the first EGR cooler portion 38*a*, regardless of the flow rate of the LT cooling water (i.e., the flow rate of the first pump 52). Then, the dew point of the gas flowing into the intercooler 24 (i.e., the mixed gas of the dehumidified EGR gas in the first EGR cooler portion 38*a* and the fresh air) is lowered by dehumidifying the EGR gas. Therefore, even if the flow rate of the LT cooling water by the first pump 52 is excessively increased with respect to the required flow rate Qp, the generation of condensed water in the intercooler 24 can be reduced. Then, the greater the flow rate of the first pump 52 is, the more sufficiently the EGR gas can be dehumidified in the first EGR cooler portion 38a, and the intake air can be more effectively cooled in the intercooler 24. Therefore, increasing the flow rate of the first pump 52 is favorable from the viewpoint of fuel efficiency and output power of the internal combustion engine 10.

Accordingly, the flow rate of the first pump 52 during the execution of the EGR may be a desired constant value such as the maximum flow rate (i.e., the maximum flow rate that the first pump 52 can output) as long as the EGR cooler outlet gas temperature Tgo can be lowered to or below the dew point Td of the EGR gas. Thus, the operation of the first pump 52 for allowing the EGR cooler outlet gas temperature Tgo to cool to or below the dew point Td of the EGR gas does not necessarily require a flow rate control executed by the ECU 70 as in the processing of step S104. In addition, according to an example in which the flow rate control is executed in accordance with the required flow rate Qp as in the processing of step S104, the EGR cooler outlet gas temperature Tgo can be lowered to or below the dew point Td while saving the power of the first pump 52.

1-5-2. Another Example of Processing Routine

In some countries or regions, the fuel supplied to the internal combustion engine 10 may contain chlorine. In such countries or regions, EGR gas having a fuel component containing chlorine may be supplied to the second EGR cooler portion 38b. In cold conditions in which the HT cooling water temperature Th is equal to or lower than the dew point Td of the EGR gas, when the EGR gas having a fuel component containing chlorine is supplied to the second EGR cooler portion 38b, there is a concern that corrosion may occur in the second EGR cooler portion 38b. In this regard, according to the routine shown in FIG. 4 described above, when the HT cooling water temperature Th is equal to or lower than the dew point Td in step S100, the EGR is stopped (prohibited). As a result, even in countries or regions where chlorine is contained in the fuel, the EGR control and the control of the cooling system 1 according to the first embodiment can be performed while preventing corrosion in the second EGR cooler portion 38b in cold conditions.

Furthermore, the routine shown in FIG. 4 may be modified as follows. That is, prior to the processing of step S100, a step of determining whether or not chlorine is contained in the fuel may be added. Then, the routine processing shown in FIG. 4 may be modified such that, when chlorine is contained in the fuel, the processing proceeds to step S100, and when, on the other hand, chlorine is not contained, the processing proceeds to step S102 without performing the determination in step S100 to execute the EGR. In countries or regions in which chlorine is not contained in the fuel, it can be said that, even if ferritic stainless steel having a relatively low corrosion resistance is used as the material of the second EGR cooler portion 38b, corrosion does not occur in the second EGR cooler portion 38b in cold conditions. Therefore, as in the routine modified as described above, it is possible to execute the EGR without depending on the HT cooling water temperature Th (i.e., even in cold conditions), and it is also possible to expand the engine operating range in which the EGR is executed.

2. Second Embodiment

Then, a second embodiment according to the present disclosure will be described with reference to FIG. 6. FIG. 6 is a schematic diagram showing a configuration of a cooling system 2 according to the second embodiment. The cooling system 2 according to the present embodiment is different from the cooling system 1 according to the first embodiment in the following points.

The cooling system 2 is provided with a circulation flow path 80 through which the cooling water (the first coolant) for cooling the intercooler 24 and the EGR cooler 38 having the two-stage cooling structure, together with the intercooler 24, the EGR cooler 38, the condensed water discharger 40, the pump 52 and a radiator 86. The circulation flow path 80 includes a first circulation flow path 82 and a second circulation flow path 84. The first circulation flow path 82 is configured in the same manner as the first circulation flow path 50 according to the first embodiment.

The second circulation flow path 60 according to the first embodiment is completely independent of the first circulation flow path 50. In contrast, the second circulation flow path 84 is separated from the first circulation flow path 82 in the interior of the EGR cooler 38. That is, the second EGR-cooler inner flow path 66 which is a part of the second circulation flow path 84 is separated from the first EGR-cooler inner flow path 56 which is a part of the first circulation flow path 82. Moreover, in the outside of the EGR cooler 38, a part of the second circulation flow path 84 is shared with a portion of the first circulation flow path 82. More specifically, an upstream portion, an inner portion, and a downstream portion of the radiator 86 in the first circulation flow path 82 will be collectively referred to as "radiator section flow path 82a". The second circulation flow path 84 shares this radiator section flow path 82a with the first circulation flow path 82 as an example. Also, the second circulation flow path 84 includes a cooling water supply flow path 84a and a cooling water return flow path 84b. The cooling water supply flow path 84a is configured to connect the downstream end of the radiator section flow path 82a and the cooling water inlet 66a of the second EGR-cooler inner flow path 66. The cooling water return flow path 84b is configured to connect the cooling water outlet 66b and the upstream end of the radiator section flow path 82a.

As described so far, in the cooling system 2 according to the present embodiment, although the EGR cooler 38 has a two-stage cooling structure, the circulation flow path 80 for cooling the intake air and the EGR gas as a whole is a single flow path using a single cooling water (first coolant). That is, in the cooling system 2, a circulation circuit (not shown) of a cooling water for cooling the engine body 10a is not used for cooling the EGR cooler 38.

Then, even in the cooling system 2 according to the present embodiment, during the execution of the EGR, the pump 52 circulates a low-temperature cooling water (first coolant) in the first circulation flow path 50 such that the EGR cooler outlet gas temperature Tgo is equal to or lower than the dew point Td of the EGR gas. This low-temperature cooling water is also supplied to the second EGR cooler portion 38b through the cooling water supply path 84a. Even with this kind of configuration, similarly to the first embodiment, the EGR gas can be preliminarily cooled in the second EGR cooler portion 38b before the EGR gas flows into the first EGR cooler portion 38a. Moreover, after passing through the second EGR cooler portion 38b, the second circulation flow path 84 joins the first circulation flow path 82 not on the upstream side of the intercooler 24 but on the downstream side of the intercooler 24. That is, the second circulation flow path 84 also does not pass through the intercooler 24 similarly to the second circulation flow path 60 according to the first embodiment. As a result, when compared with an example shown in FIG. 7 described below, it is possible to reduce a decrease in the intake air cooling capacity of the intercooler 24 due to a temperature rise of the cooling water. Therefore, the intake air (mixed gas) can be cooled satisfactorily while the generation of condensed water in the intercooler 24 is reduced. In addition, the EGR gas is pre-cooled by the second EGR cooler portion 38b as described above. Therefore, similarly to the first embodiment, even a material having relatively low heat resistance (for example, austenitic stainless steel) can be selected as the material of the first EGR cooler portion 38a if the corrosion resistance to the condensed water is satisfied.

3. Third Embodiment

Figure 7:
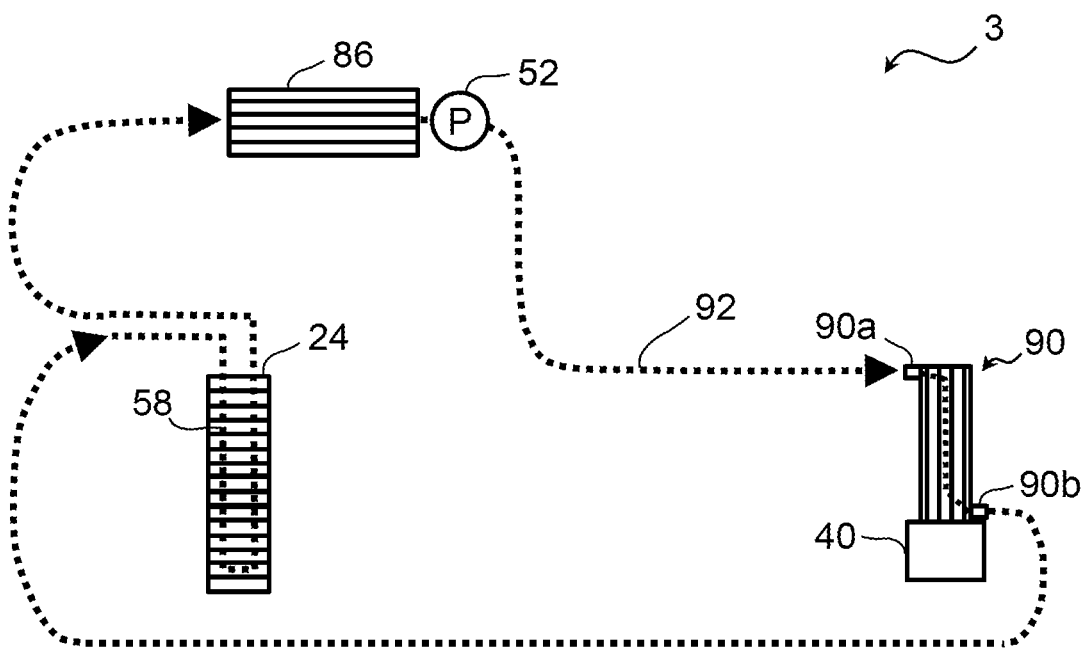
FIG. 7 is a schematic diagram showing a configuration of a cooling system according to a third embodiment of the present disclosure.

Then, a third embodiment according to the present disclosure will be described with reference to FIG. 7. FIG. 7 is a schematic diagram showing a configuration of a cooling system 3 according to the third embodiment. The cooling system 3 according to the present embodiment is different from the cooling systems 1 and 2 according to the first and second embodiments in the following points.

In the first and second embodiments described above, the EGR cooler 38 having a two-stage cooling structure is exemplified. In contrast, the cooling system 3 is provided with an EGR cooler 90 having a one-stage cooling structure and a first circulation flow path 92, together with the intercooler 24, the condensed water discharger 40, the pump 52, and the radiator 86. The EGR cooler 90 includes a single cooling water inlet 90a and a single cooling water outlet 90b. Even in the cooling system 3, during the execution of the EGR, the pump 52 circulates a low-temperature cooling water (first coolant) in the first circulation flow path 92 such that the EGR cooler outlet gas temperature Tgo is equal to or lower than the dew point Td of the EGR gas. The cooling water (first coolant) flowing out from the radiator 86 is supplied from the cooling water inlet 90a to the EGR cooler 90, and then the cooling water flowing out from the cooling water outlet 90b of the EGR cooler 90 flows toward the intercooler 24.

Even in the cooling system 3 according to the present embodiment described so far, the EGR gas is dehumidified by the EGR cooler 90 and the discharger 40. The mixed gas of the dehumidified EGR gas and fresh air is supplied to the intercooler 24. The dew point of this mixed gas is lowered by the dehumidification of the EGR gas. Moreover, the temperature of the cooling water supplied to the intercooler 24 becomes higher than that when the cooling water flows into the EGR cooler 90. Therefore, the temperature of the cooling water at the time of supply to the intercooler 24 takes a value on the higher side with respect to the dew point of the mixed gas. Therefore, even in the cooling system 3, the dehumidification of the EGR gas can be used to reduce the generation of the condensed water in the intercooler 24 without executing a complicated control for ensuring the responsiveness of the EGR gas temperature.

4. Another Example of EGR Cooler Having Two-Stage Cooling Structure

Figure 8:
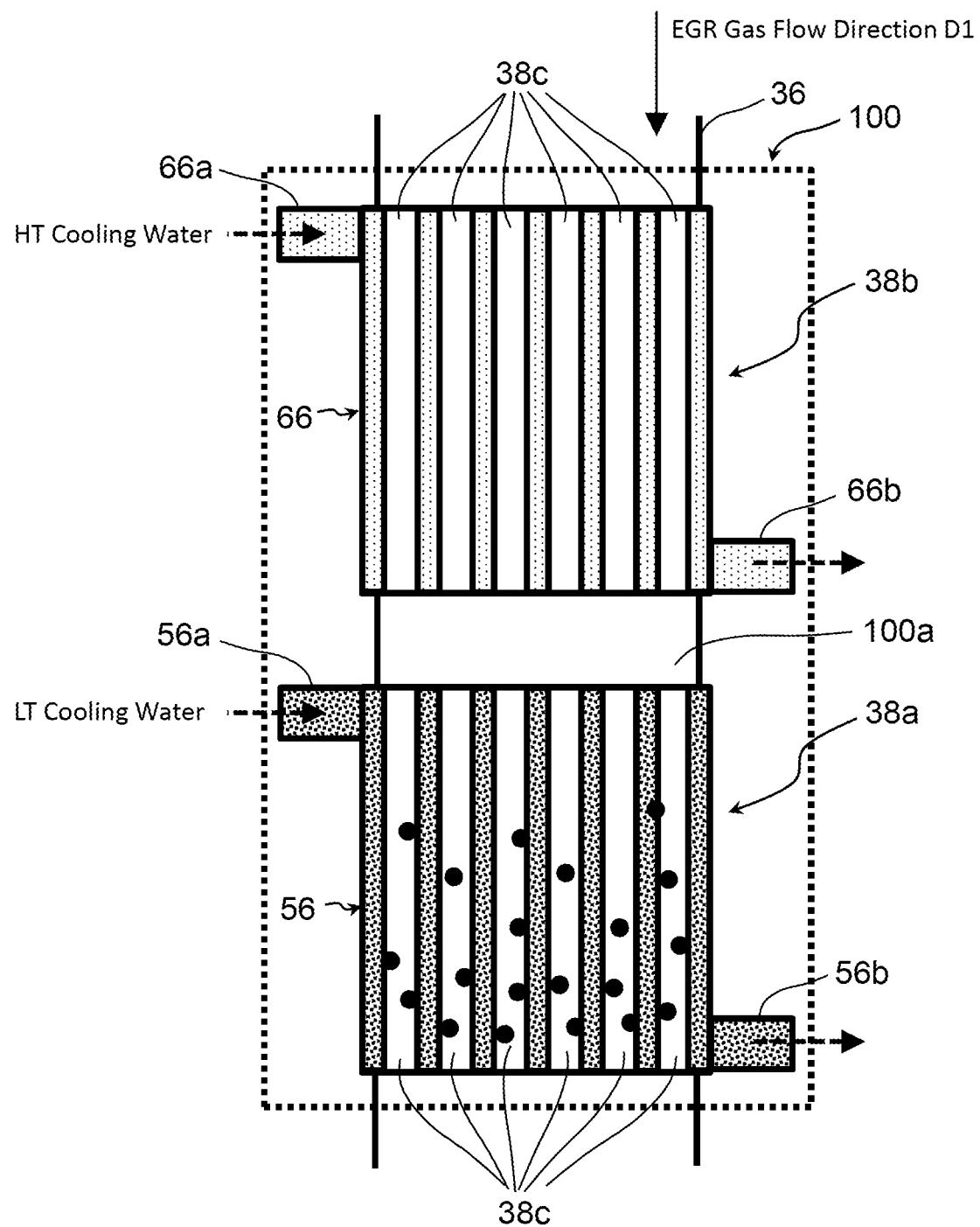
FIG. 8 is a schematic diagram showing another example of the EGR cooler having a two-stage cooling structure according to the present disclosure.

FIG. 8 is a schematic diagram showing another example of the EGR cooler having a two-stage cooling structure according to the present disclosure. According to the EGR cooler 38 shown in FIG. 3, as described above, the inner gas flow paths 38c of the second EGR cooler portion 38b is continuous with the inner gas flow paths 38c of the first EGR cooler portion 38a. In contrast, in an EGR cooler 100 shown in FIG. 8, the inner gas flow paths 38c of in the second EGR cooler portion 38b communicates with the inner gas flow paths 38c of the first EGR cooler portion 38a via an inner gas flow path 100a. Where an EGR cooler having a two-stage cooling structure is included, as in the example of the EGR cooler 100, a heat exchanger corresponding to the second EGR cooler portion on the second circulation flow path side and a heat exchanger corresponding to the first EGR cooler portion on the first circulation flow path side may be arranged apart from each other via an inner gas flow path.

The embodiments and modification examples described above may be combined in other ways than those explicitly described above as required and may be modified in various ways without departing from the scope of the present disclosure.

What is claimed is:

1. A cooling system applied to an internal combustion engine equipped with an EGR device including an EGR passage connecting an exhaust passage and an intake passage, the cooling system comprising:
    an intercooler disposed in the intake passage and configured to cool intake air;
    an EGR cooler disposed in the EGR passage and configured to cool EGR gas;
    a condensed water discharger configured to discharge condensed water generated in the EGR cooler from the EGR passage;
    a radiator configured to cool a first coolant to or below a dew point of the EGR gas flowing into the EGR cooler;
    a first circulation flow path configured to circulate the first coolant in an order of the radiator, the EGR cooler, and the intercooler, with the first coolant flowing out of the EGR cooler and flowing directly into the intercooler from the EGR cooler before returning to the radiator; and
    a pump disposed in the first circulation flow path and configured to circulate the first coolant such that an outlet gas temperature of the EGR cooler is equal to or lower than the dew point of the EGR gas flowing into the EGR cooler.

2. The cooling system according to claim 1, further comprising a second circulation flow path configured to supply the first coolant or a second coolant different from the first coolant to the EGR cooler on an upstream side of the first circulation flow path when viewed in a flow direction of the EGR gas in the EGR passage, the second circulation flow path being separated from the first circulation flow path inside the EGR cooler and not passing through the intercooler.

3. The cooling system according to claim 2, wherein
    the second circulation flow path is independent of the first circulation flow path and is configured to circulate the second coolant.

4. The cooling system according to claim 2, wherein
    the cooling system is configured such that the second coolant having a higher temperature than the dew point of the EGR gas flowing into the EGR cooler is supplied to the EGR cooler from the second circulation flow path.

5. The cooling system according to claim 4, wherein
    the EGR cooler includes:
    a first EGR cooler portion including a first EGR-cooler inner flow path being a part of the first circulation flow path; and
    a second EGR cooler portion including a second EGR-cooler inner flow path being a part of the second circulation flow path, and the second cooler portion is disposed on an upper side in a vertical direction with respect to the first EGR cooler portion.

6. The cooling system according to claim 5, wherein
the first EGR cooler portion is made of austenitic stainless steel, and
the second EGR cooler portion is made of ferritic stainless steel.

\* \* \* \* \*